(12) United States Patent
Lovat

(10) Patent No.: US 10,610,335 B2
(45) Date of Patent: Apr. 7, 2020

(54) IMPRESSION TRAY

(71) Applicant: OPRO International Limited, Hemel Hempstead, Hertfordshire (GB)

(72) Inventor: Anthony Lovat, Shenley (GB)

(73) Assignee: OPRO International Limited, Hermel, Hempstead, Hertfordshire (GB)

( * ) Notice: Subject to any disclaimer, the term of this patent is extended or adjusted under 35 U.S.C. 154(b) by 0 days.

(21) Appl. No.: 16/077,409

(22) PCT Filed: Jan. 16, 2017

(86) PCT No.: PCT/GB2017/050092
§ 371 (c)(1),
(2) Date: Aug. 10, 2018

(87) PCT Pub. No.: WO2017/137717
PCT Pub. Date: Aug. 17, 2017

(65) Prior Publication Data
US 2019/0046301 A1 Feb. 14, 2019

(30) Foreign Application Priority Data
Feb. 11, 2016 (GB) .................... 1602485.3

(51) Int. Cl.
*A61C 19/00* (2006.01)
*A61C 9/00* (2006.01)
*A63B 71/08* (2006.01)

(52) U.S. Cl.
CPC .......... *A61C 9/0006* (2013.01); *A63B 71/085* (2013.01)

(58) Field of Classification Search
CPC .......... A61C 9/0006; A61F 5/56; A61F 5/566; A63B 71/085
See application file for complete search history.

(56) References Cited

U.S. PATENT DOCUMENTS

| | | | | |
|---|---|---|---|---|
| 1,652,910 A | * | 12/1927 | Psayla ................. | A61C 9/0006 433/41 |
| 2,117,846 A | | 5/1938 | Kalvin | |
| 3,574,259 A | * | 4/1971 | Jones ...................... | A61C 9/00 433/38 |
| 3,624,909 A | | 12/1971 | Greenberg | |

(Continued)

FOREIGN PATENT DOCUMENTS

| AU | 2008221619 | 9/2007 |
| FR | 629772 | 11/1972 |

(Continued)

OTHER PUBLICATIONS

GB Search Report for corresponding GB Patent Application No. GB1602485.3 dated Jul. 22, 2016, 4 pages.

(Continued)

*Primary Examiner* — Nicholas D Lucchesi
(74) *Attorney, Agent, or Firm* — Lee & Hayes, P.C.

(57) ABSTRACT

An apparatus comprising: a tray for receiving a mouldable element and for insertion into a user's mouth to allow the user to apply a biting force to the mouldable element to provide an impression of the user's teeth, the tray comprising: opposed sidewalls extending from a base, wherein at least one of the opposed sidewalls is configured to move inwards when the user applies a biting force to the mouldable element received by the tray.

18 Claims, 4 Drawing Sheets

(56) References Cited

U.S. PATENT DOCUMENTS

| | | | | |
|---|---|---|---|---|
| 5,340,308 | A * | 8/1994 | Cukjati | A61C 9/0006 433/1 |
| 6,428,315 | B1 | 8/2002 | Prestipino et al. | |
| 8,360,772 | B1 * | 1/2013 | McCarthy | A61C 9/0006 433/41 |
| 2004/0009451 | A1 * | 1/2004 | Skinner | A61C 9/0006 433/43 |
| 2005/0032018 | A1 * | 2/2005 | White | A61C 9/0006 433/41 |
| 2005/0126563 | A1 * | 6/2005 | van der Burg | A61B 17/8061 128/200.24 |
| 2005/0153256 | A1 | 7/2005 | Livolsi | |
| 2006/0150986 | A1 * | 7/2006 | Roue | A61B 17/0401 128/848 |
| 2008/0311536 | A1 * | 12/2008 | Kim | A61C 9/0006 433/37 |
| 2011/0171593 | A1 * | 7/2011 | Ross | A61C 9/0006 433/41 |
| 2011/0185525 | A1 | 8/2011 | Stapelbroek et al. | |
| 2011/0247635 | A1 | 10/2011 | Jansheski | |
| 2012/0225402 | A1 | 9/2012 | Crivello et al. | |
| 2017/0001095 | A1 * | 1/2017 | Lovat | A63B 71/085 |
| 2019/0216632 | A1 * | 7/2019 | Fallon | A61F 5/566 |

FOREIGN PATENT DOCUMENTS

| | | |
|---|---|---|
| GB | 285715 | 2/1928 |
| WO | WO2015113893 | 8/2015 |

OTHER PUBLICATIONS

PCT International Preliminary Report on Patentability for corresponding International Application No. PCT/GB2017/050092 dated Aug. 23, 2018, 12 pages.

PCT Search Report for corresponding PCT Application No. PCT/GB2017/050092 dated Mar. 22, 2017, 15 pages.

* cited by examiner

IMPRESSION TRAY

This Application is a 35 U.S.C. § 371 national phase application of PCT/GB2017/050092 filed on Jan. 16, 2017, which claims priority to GB application 1602485.3 filed on Feb. 11, 2016, which is incorporated herein by reference.

TECHNICAL FIELD

The invention relates to an apparatus for receiving a mouldable element for use in providing an impression of a user's teeth. Specifically, the invention may relate to, but need not be limited to, an apparatus for receiving a conformable mouthguard and for fitting the conformable mouthguard to the user's teeth.

BACKGROUND

A mouthguard is a device worn in the mouth of a wearer and intended to protect the teeth and gums during activity that may risk injury thereto. Typically, mouthguards cover the top teeth and gums and are most often used to prevent injury to areas of the mouth during collisions between athletes in sports such as rugby and hockey. There are various names that may be given to a mouthguard, including gumshield, mouth protector, and mouthpiece.

It is important that a mouthguard fits the wearer's mouth adequately such that when worn it is retained in a correct position in the mouth covering the teeth and gums of the wearer. This is especially important during a sporting event, where sudden motions of an athlete may cause a poorly fitting mouthguard to become dislodged from its fitted position. This can increase the risk of the athlete sustaining an injury to the mouth from a collision. Further, a mouthguard that is poorly fitting may have to be frequently put back into position in the wearer's mouth or retained in position by the user using their lower jaw or tongue, both of which could cause inconvenience or injury.

Broadly speaking, mouthguards may be split into three categories: custom mouthguards, self-fit (typically boil and bite) mouthguards and stock mouthguards. Self-fit mouthguards encompass mouthguards that are conformable in at least one state and may be fitted to a user's mouth after purchase and through some action by the wearer. Custom mouthguards may be fabricated using measurements or information obtained from the eventual intended wearer by a dental professional. Stock mouthguards encompass mouthguards that are purchased in a preformed shape. Stock mouthguards may be non-customised and/or non-customisable in respect of a wearer's mouth and should therefore fit a user straight "off the shelf".

Boil and bite mouthguards are a type of conformable mouthguard and are typically manufactured from thermoplastic materials allowing a user to immerse the mouthguard in hot water until it becomes soft and pliable. Then the user places it into their mouth and uses their fingers, lips, tongue, cheeks and biting pressure shape the mouthguard to the contours of their mouth to achieve an improved fit.

However, although there can be an improved fit achieved from the boil and bite mouthguards, there are also disadvantages associated with them. The process of customising boil and bite mouthguards can be time consuming and require significant effort, and the result may not be a well-fitting mouthguard. Further, the results of the process are inconsistent and unreliable.

Custom mouthguards can be produced using an impression of the prospective wearer's teeth and gums typically prepared by a dentist or other dental professional. The custom mouthguard is fabricated by a professional onto a model of the teeth made from the impression so that, when it is finished, it fits accurately into the wearer's mouth and is retained in the correct position.

Although custom mouthguards can provide an improved fit within the user's mouth, they require a dental professional to make an impression of the eventual wearer's teeth and then to fabricate the mouthguard. This process can up to take several weeks and can be costly.

Stock mouthguards (also known as ready-made or non-customised mouthguards) are typically manufactured in a preformed shape and are often available to buy in different sizes directly "off the shelf". Stock mouthguards are typically cheaper than customisable mouthguards and are configured to be immediately usable upon purchase. Although stock mouthguards do not have the disadvantages associated with boil and bite and custom mouthguards outlined above, it is likely that they will not fit the wearer's mouth accurately and may not be retained in the correct position.

SUMMARY

According to an aspect of the invention, there is provided an apparatus comprising: a mouldable element receiving means, which may be a tray, for receiving a mouldable element and for insertion into a user's mouth to allow the user to apply a biting force to the mouldable element to provide an impression of the user's teeth, the tray comprising: mouldable element compression means, which may be opposed sidewalls extending from a base, wherein at least one of the opposed sidewalls is moveable inwards for compressing the mouldable element against the user's teeth.

Optionally, the apparatus further comprises a compression mechanism configured to be actuated by the user and configured to move the at least one opposed sidewall inwards.

Optionally, the compression mechanism is operable on application of the biting force by the user.

Optionally, the compression mechanism further comprises a holder for receiving the tray, and configured for moving the at least one opposed sidewall.

Optionally, the holder is configured to slideably receive the tray, such that the tray slides further into the tray when the user applies the biting force.

Optionally, the holder is configured to deflect the at least one opposed sidewall inwards when the tray slides further into the holder.

Optionally, the opposed sidewalls are divergent from the base, and wherein the opposed sidewalls are in contact with a deflecting surface of the holder when the tray is received by the holder.

Optionally, the compression mechanism is configured to move the at least one of the opposed sidewalls by rotation.

Optionally, the apparatus further comprises a limiter configured to limit the movement of the at least one opposed sidewall.

Optionally, the tray is articulated for shaping the tray to fit an arch of the user's teeth.

Optionally, the tray comprises a plurality of discrete articulated sections.

Optionally, the articulated sections are equally spaced.

Optionally, the base of each articulated section is tapered to maintain equal spacing.

Optionally, the articulated sections comprise discrete inner sections and discrete outer sections, and wherein there are fewer discrete inner sections than discrete outer sections to maintain equal spacing.

Optionally, the holder is articulated for shaping the holder to the arch of the user's teeth.

Optionally, the holder comprises a plurality of articulated sections, each corresponding to an articulated section of the tray.

Optionally, each of the plurality of articulated sections of the tray is configured to deflect the corresponding articulated section of the holder.

Optionally, one or more of the articulated sections of the holder and the corresponding articulated section of the tray are configured to apply a different force when moving the at least one opposed sidewall.

Optionally, the mouldable element that the tray is configured to receive is one of a boil and bite mouthguard and a dental impression material, such as dental putty.

According to a further aspect of the invention, there is provided an apparatus described above and further comprising the mouldable element.

According to a further aspect of the invention, there is provided a kit of parts comprising: a tray for receiving a mouldable element and for insertion into a user's mouth to allow the user to apply a biting force to the mouldable element to provide an impression of the user's teeth, the tray comprising opposed sidewalls extending from a base, wherein at least one of the opposed sidewalls is moveable inwards for compressing the mouldable element against the user's teeth; and a holder for receiving the tray, and configured to move the at least one opposed sidewall.

The kit of parts may further comprise the mouldable element

BRIEF DESCRIPTION OF THE DRAWINGS

Exemplary embodiments of the invention are disclosed herein with reference to the accompanying drawings, in which.

DETAILED DESCRIPTION

Generally disclosed herein are exemplary apparatus configured to receive a mouldable element and provide an impression of a user's teeth. Exemplary apparatus are configured to comprise a compression mechanism that is configured to move one or more sidewalls of the apparatus inwards for compressing the mouldable element against the user's teeth and/or gums. Exemplary apparatus may comprise a compression mechanism configured to translate a biting force applied to the mouldable element by the user into a force exerted by the apparatus on the mouldable element to compress it onto the user's teeth and gums. The apparatus achieves this by translating the biting force of the user into an inward movement of one or more sidewalls of the apparatus.

In this way an accurate impression of the user's teeth can be provided with little or no additional effort from the user. Further, there is no skilled professional required to take the impression. Further still, the results obtained by the apparatus are controllable and repeatable.

The term 'impression' as used herein encompasses the generation of any profile of a user's teeth. It should be understood that this term need not limit the invention to any specific use and may, for example, encompass a dental impression and/or an impression made as part of fitting a mouthguard. Specifically, an impression of a user's teeth can be considered to be taken when fitting a conformable (e.g. a boil and bite) mouthguard, as the internal surface of the mouthguard comprises a profile of the user's teeth after fitting. Also, an impression of a user's teeth can be considered to be taken, if that impression is suitable for generating a cast to which a custom mouthguard may be fitted.

Figure 1A:
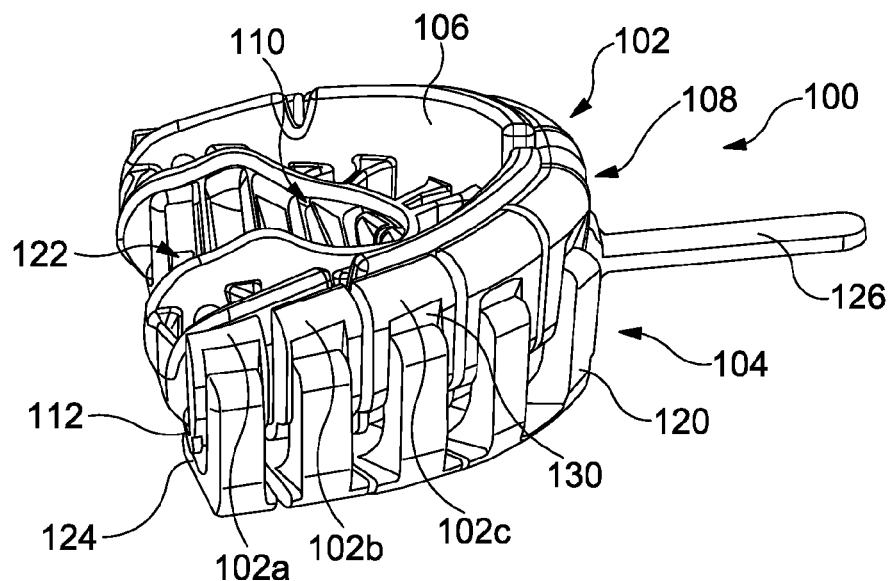
FIG. 1a is a perspective view of an apparatus for taking an impression of a user's teeth.
Figure 1B:
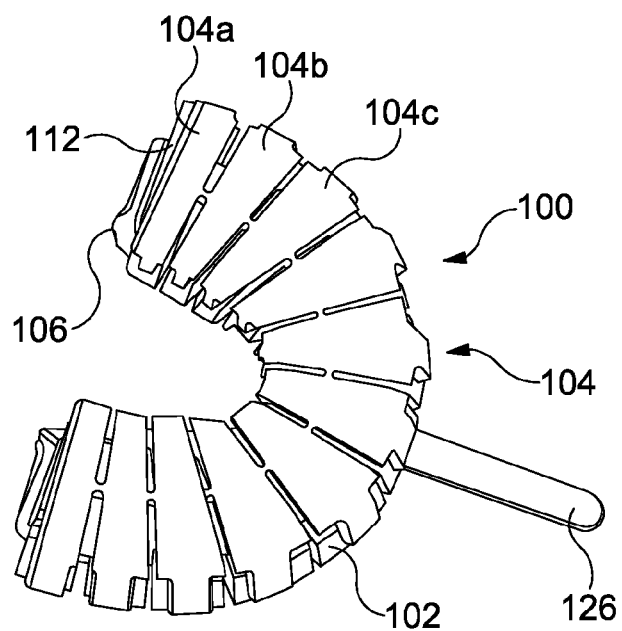
FIG. 1b is a bottom view of an apparatus for taking an impression of a user's teeth.
Figure 1C:
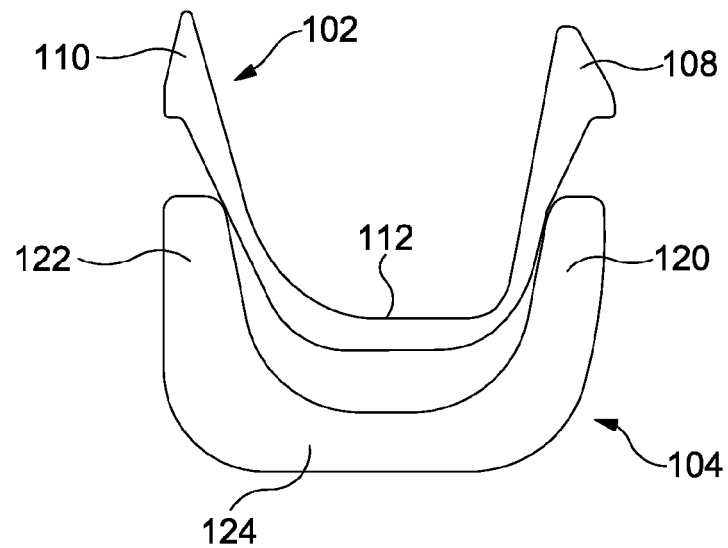
FIG. 1c is a section through an apparatus for taking an impression of a user's teeth.
Figure 3:
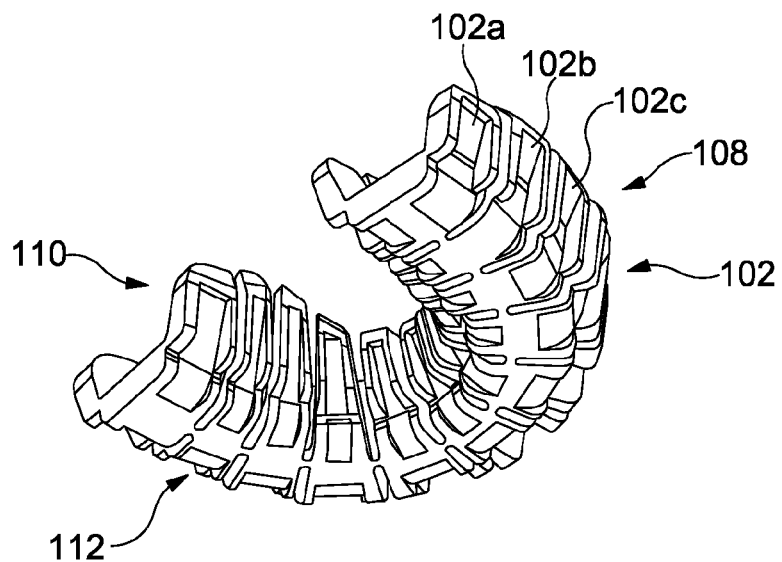
FIG. 3 is a perspective view of a tray.
Figure 4:
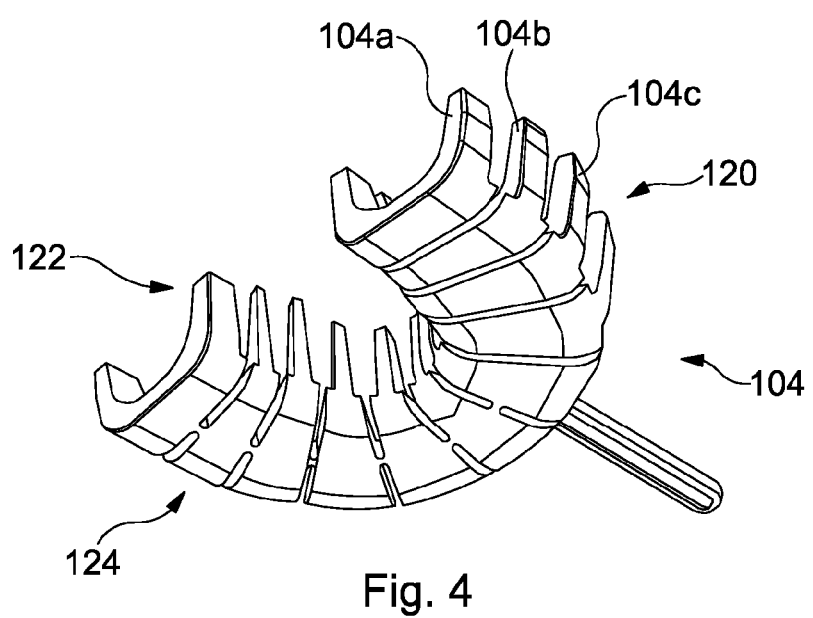
FIG. 4 is a perspective view of a holder.

FIGS. 1a-1c show an exemplary apparatus 100 comprising a tray 102 and a holder 104. The tray 102 is configured to receive a mouldable element 106. The holder 104 is configured to receive the tray 102. The tray 102 and the holder 104 are seen separately in FIGS. 3 and 4 respectively.

The term 'mouldable element' as used herein encompasses any material that can be moulded to a user's teeth and/or gums to provide an impression of those teeth, for example a conformable (e.g. boil and bite) mouth guard or dental putty.

The tray 102 comprises opposed sidewalls 108 and 110, and a base 112. The opposed sidewalls 108, 110 extend from the base 112. Therefore, the base 112 and the opposed sidewalls 108, 110 of the tray 102 form a channel. In use, a first sidewall 108 corresponds to the palatal/lingual surface of a user's teeth and a second sidewall 110 corresponds to the labial/buccal surface of a user's teeth. That is, the opposed sidewalls 108, 110 are configured to be broadly aligned with the palatal/lingual and labial/buccal surfaces of the user's teeth and the base 112 is configured to be broadly aligned with the occlusal plane or biting surface.

The opposed sidewalls 108, 110 extend along the periphery of the base 112. The opposed sidewalls 108, 110 additionally extend upwards from the base 112 at an angle, such that the opposed sidewalls 108, 110 are divergent from the base 112.

It is noted that relative terms such as inner, outer, upper, lower, front and back are used herein for descriptive purposes and need not limit the scope of the methods and apparatus disclosed.

The opposed sidewalls 108, 110 are configured such that they are movable inwards. That is, the opposed sidewalls 108, 110 are moveable towards each other, such that they are moveable inwards with respect to the channel formed by the opposed sidewalls 108, 110 and the base 112. This movement allows a mouldable element 106 received within the tray 102 to be compressed against the teeth of the user. In the exemplary apparatus of FIGS. 1a-1c, the opposed sidewalls 108, 110 are flexible or plastically deformable such that they may be deflected inwards. This is achieved when a user applies a biting force to the mouldable element 106. When the user removes the biting force the opposed sidewalls 108, 110 may be configured to move outwards.

In exemplary apparatus, the opposed sidewalls 108, 110 may be formed from a plastically deformable or an elastomeric material. That is, the opposed sidewalls 108, 110 may be configured to deform such that the do not return under an elastic force, or such that they do return under an elastic force. In exemplary arrangements, the initial state of the opposed sidewalls 108, 110 is at a divergent angle from the base 112. The initial state may represent a resting state in elastomeric embodiments. The opposed sidewalls 108, 110 may be deflected or deformed inwards under a force and return to the resting state when the force is removed.

The opposed sidewalls 108, 110 and the base 112 form a channel within which the mouldable element 106 is received. The width of the channel is sufficient to allow reception of the mouldable element 106. The width of the channel is further sufficient such that the sidewalls of the mouldable element 106 after use of the apparatus have a width sufficient for the intended purpose of the mouldable element. That is, if the mouldable element is a conformable mouthguard then the width of the walls must be sufficient to provide adequate shock absorption, and if the mouldable element is for casting a model of the user's teeth then the width of walls must be sufficient to provide structural integrity for that purpose.

The holder 104 forms part of a compression mechanism configured to move the opposed sidewalls of the tray inwards, as described below. The holder 104 comprises opposed sidewalls 120 and 122, a base 124 and a handle 126. For the remainder of the document, a distinction is made between the tray opposed sidewalls 108, 110 and base 112 and the holder opposed sidewalls 120, 122 and base 124. The holder opposed sidewalls 120, 122 extend upwards substantially vertically from a periphery of the holder base 124 and extend along the periphery of the holder base 124.

The holder opposed sidewalls 120, 122 and the holder base 124 form a holder channel. The width of the holder channel is sufficient to receive the tray 102 therein, although in their initial state the tray opposed sidewalls 108, 110 may rest on an upper portion of the holder opposed sidewalls 120, 122, such that the tray 102 stands proud of the holder 104 and there is a gap between the tray base 112 and the holder base 124. This is best shown in FIG. 1c.

In the exemplary apparatus 100, the tray 102 is slideably received by the holder 104. As such the tray 102 is able to move upwards and downwards within the holder 104. In the exemplary apparatus of FIGS. 1a-1c the opposed sidewalls 108, 110 of the tray 102 are in contact with a deflecting surface formed by at least part of an inner surface of the holder opposed sidewalls 120, 122. It is noted that the slideable reception of the tray 102 within the holder 104 requires the deformation of the tray opposed sidewalls 108, 110. Therefore, sufficient force must be applied in order to effect deformation.

In use, the user places the apparatus 100, comprising the tray 102, the holder 104 and the mouldable element 106 into their mouth using the handle 126. When the user applies a biting force to the mouldable element 106 received by the tray 102, the mouldable element 106, tray 102 and holder 104 are compressed between the biting surfaces of the upper and lower teeth of the user. The tray 102 slides downwards, further into the holder 104 such that the gap between the tray base 112 and the holder base 124 reduces and outer surfaces of the tray opposed sidewalls 108, 110 slide past the deflecting surface of the holder 104. This results in interaction between the tray opposed sidewalls 108, 110 and the deflecting surface 128, which is configured to deflect the tray opposed sidewalls 108, 110. The holder opposed sidewalls 120, 122 may therefore be stiffer than the tray opposed sidewalls 108, 110 to effect deformation.

The deflecting surface 128 is configured to deflect the tray opposed sidewalls 108, 110 inwards. In the exemplary apparatus 100 the tray 102 comprises recesses 130 configured to guide the deflection of the tray opposed sidewalls 108, 110.

The inward deflection of the tray opposed sidewalls 108, 110 results in a compression of the mouldable element 106 against the lingual and buccal surfaces of the users teeth. The inwards deflection of the tray opposed sidewalls 108, 110, and therefore the compression of the mouldable element 106 towards the user's teeth, continues until the user reduces the biting force, or the tray base 114 makes contact with the holder base 124. In this sense, the holder base 124 may be considered a limiter to limit the amount of inward deflection of the tray opposed sidewalls 108, 110.

The user may retain the biting force at the limiter until such time as the mouldable element 106 is set to the profile of the user's teeth. In the case of a boil and bite mouthguard, this may be until the boil and bite mouthguard has cooled sufficiently.

The user then removes the biting force. In exemplary arrangements in which the tray opposed sidewalls 108, 110 are plastically deformable, the mouldable element 106 and the tray 102 may remain in the holder 104 on removal of the biting force. The user then removes the entire assembly from their mouth and extracts the mouldable element 106, now including an impression of the user's teeth, from the tray 102. In exemplary arrangements in which the tray opposed sidewalls 108, 110 are elastically deformable, the tray 102 may slide out of the holder 104 under an elastic force exerted by the tray opposed sidewalls 108, 110. That is, the tray opposed sidewalls may 108, 110 slide over the deflecting surface return to their resting state, which is at an angle divergent from the tray base 112. This releases the mouldable element 106, which may be removed from the tray 102.

Figure 1D:
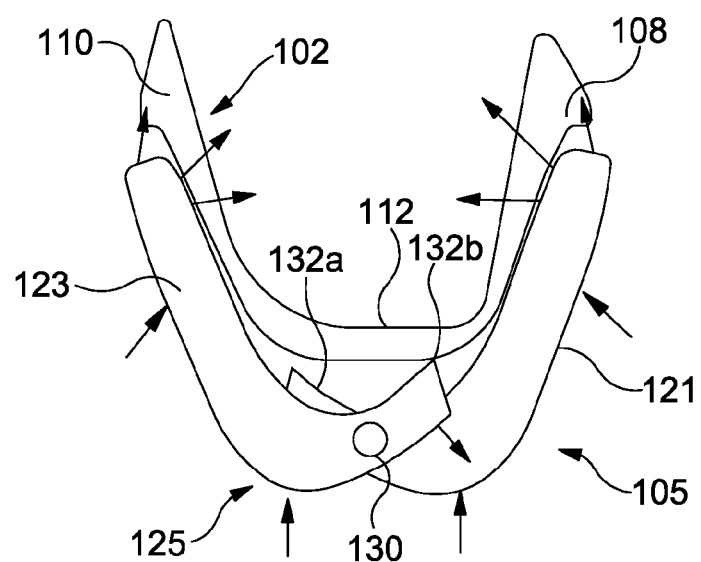
FIG. 1d is a section through an apparatus for taking an impression of a user's teeth.

Alternate embodiments may use different methods to compress the mouldable element against the user's teeth. For example, one or both of the tray opposed sidewalls or the holder opposed sidewalls may be configured to rotate inwards to compress the mouldable element against the user's teeth. Such an arrangement is shown in FIG. 1d. In the exemplary arrangement of FIG. 1d, the holder opposed sidewalls 121, 123 are thinned where they join the base 125 of the holder to produce a hinge. The hinge is formed from a rotatable connection 130 between opposed sides of the tray base 125. Applying a biting force to slide the tray 102 within the holder 105 forces the base of the tray 102 against lever arms 132a-b that rotates the holder opposed sidewalls 121, 123 about the rotatable connection 130, thereby moving the tray opposed sidewalls 108, 110 inwards and compressing the mouldable element (not shown in FIG. 1d) against a user's teeth. It is noted that in other exemplary arrangements, the tray opposed sidewalls 108, 110 may be configured to rotate. In such arrangements, there may be no need for the holder 105 and the tray opposed sidewalls may be rotatably connected to or at the base 112—the tray 102 may take substantially the same form as the holder 105. When a mouldable element is received within the tray 102 and a biting force is applied then the sidewalls of the tray would rotate inwards. In these exemplary arrangements, the compression mechanism is formed, at least in part, by the rotatable connection.

Alternatively, other arrangements may be used to deflect the tray opposed sidewalls 108, 110. Further, it is noted that the apparatus disclosed herein may be configured to provide impressions of the upper and/or lower teeth of the user.

It can be seen in FIGS. 1a and 1b that the tray 102 may be articulated. This allows the tray 102 to shape to an arch of the user's teeth. This will occur automatically when the user places their teeth in a mouldable element 106 received within the tray 102 as the articulated nature of the tray will naturally conform to the user's arch.

The tray 102 comprises a plurality of articulated sections 102a-c (only three sections are referenced, although the description herein may apply to more than three). The exemplary apparatus 100 comprises eleven articulated sections 102a-c, but other numbers of sections are possible. The number of articulated sections shown in FIGS. 1a and 1b is not limiting, and exemplary apparatus may comprise any number of articulated sections. Each of the plurality of articulated sections 102a-c are connected by a joint about which adjacent articulated sections 102a-c may be rotated relative to each other. The joints may comprise an elongate section of material that is flexible to articulate the sections 102a-c. The joint may comprise an elongate plastically or elastically deformable material. The joints may together form a spine along the tray base 112. In exemplary apparatus, the tray 102 is completely manufactured from a plastically and/or elastically deformable material.

The articulated sections 102a-c are configured such that the tray 102 is able to fit to the unique arch of a user's teeth. In this way the apparatus 100 is suitable for a variety of users.

The articulated sections 102a-c are configured such that the spacing between each individual articulated section 102a-c at inner and outer peripheries are variable. The inner periphery corresponds to the palatal or lingual surface of a user's teeth, while the outer periphery corresponds to the buccal surface of a user's teeth.

In the exemplary apparatus 100, the spacing between each articulated section 102a-c is equal when the tray 102 is in the resting position. In other words, in the rest position the distance between each articulated section 102a-c at the inner periphery is equal, and the distance between each articulated section 102a-c at the outer periphery is equal. Further, the distance between each articulated section 102a-c may be the same at the inner periphery and at the outer periphery when the tray 102 is in the resting position.

The separation between the articulated sections 102a-c at the inner and outer peripheries may be configured such that the mouldable element does not escape between the articulated sections 102a-c when the tray opposed sidewalls 108, 110 are moved inwards. In other arrangements, for example those configured for use with dental putty, the separation between the articulated sections 102a-c at the inner and outer peripheries may be configured to allow some bulging of the mouldable element between the articulated sections 102a-c when the tray opposed sidewalls 108, 110 are moved inwards. The separation between the articulated sections 102a-c at the inner and outer peripheries may be configured based on the material used for the mouldable element, and in exemplary arrangements may be in a range from 0.5 mm to 2.5 mm, or in a range from 1 mm to 2 mm.

To account for the tighter radius of the apparatus at the inner periphery compared with the outer periphery, the articulated sections 102a-c are tapered towards the inner periphery to maintain equal spacing.

The holder 104 comprises a plurality of articulated sections 104a-c. The articulated sections 104a-c of the holder 104 operate in the same way as the articulated sections 102a-c of the tray 102. It can be seen from FIG. 1b that each of the plurality of tray articulated sections 102a-c is received by a corresponding articulated section 104a-c of the holder 104. As such, a deflection of each of the plurality of articulated sections 102a-c of the tray 102 results in a deflection of each of the corresponding articulated sections 104a-c of the holder 104.

When the apparatus 100 is in use (i.e. when the tray 102 receives a mouldable element 106 and the user's teeth) each articulated section 102a-c of the tray 102 may deflect about the joint such that the spacing between each articulated section may reduce or increase depending on the arch of the individual user's teeth.

The articulated sections 102a-c are 'discrete' from each other in that they are separate from each other and are separably operable. The term 'discrete' is used in this document to encompass a situation wherein elements have independent operation and/or movement, although they may be joined.

The tray opposed sidewalls 108, 110 are the same height, although in other arrangements they may be different heights. Further, the holder opposed sidewalls 120, 122 are the same height, although in other arrangements they may be different heights.

The tray opposed sidewalls 108, 110 of each articulated section 102a-c are individually moveable inwards. That is, each tray opposed sidewalls 108, 110 of each articulated section 102a-c may be deflected inwards independently. Accordingly, the tray opposed sidewalls 108, 110 of one or more articulated sections 102a-c of the tray 102 may be configured to apply a different inward force to the tray opposed sidewalls 108, 110 of one or more other articulated sections 102a-c. Therefore, the tray opposed sidewalls 108, 110 may be configured to apply a different inward pressure at different locations. In other arrangements, the holder opposed sidewalls 120, 122 may be configured to deflect the tray opposed sidewalls 108, 110 by different amounts to apply different inward pressures. For example, this may be done by varying the width of the holder channel, or by varying the height of the holder opposed sidewalls 120, 122.

Figure 2A:
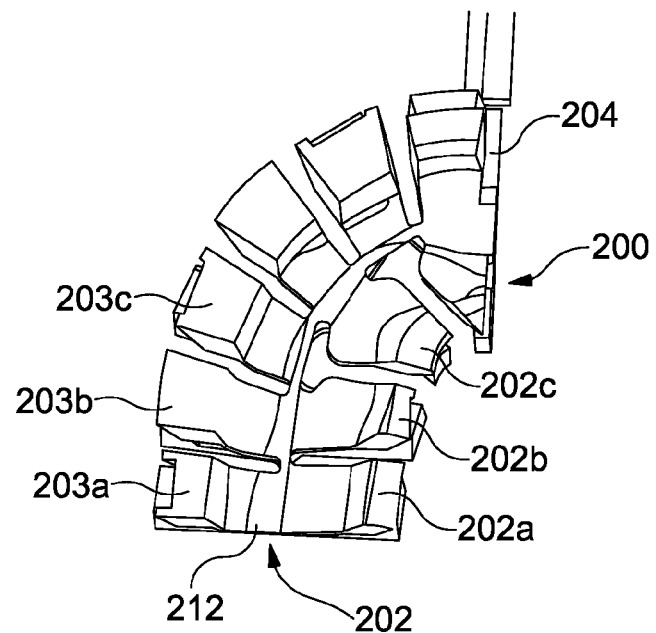
FIG. 2a is a partial top view of an apparatus for taking an impression of a user's teeth.
Figure 2B:
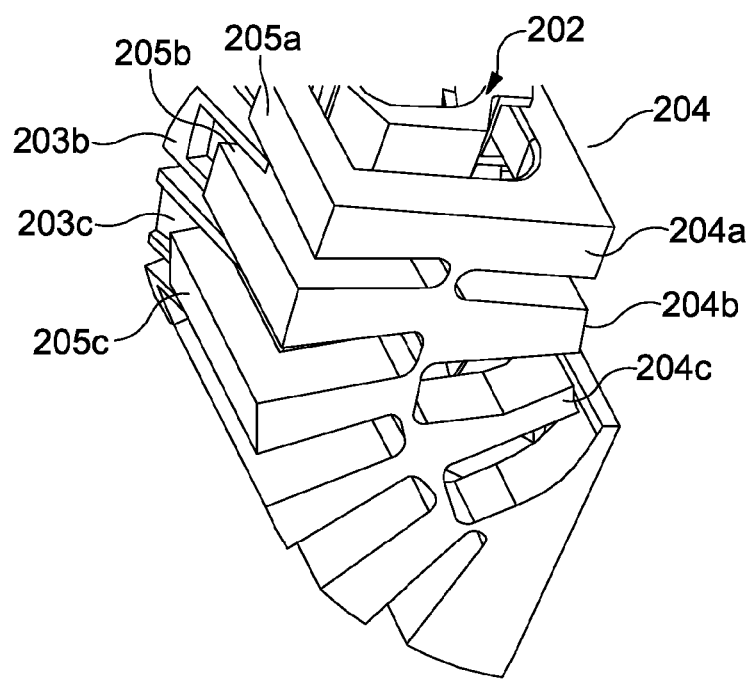
FIG. 2b is a partial perspective view of an apparatus for taking an impression of a user's teeth.

A section of an alternate apparatus 200 is shown in FIGS. 2a and 2b. Many of the features of FIGS. 2a and 2b are the same or similar to those shown in FIGS. 1a and 1b and are not therefore discussed again in detail here, except where they differ from those of FIGS. 1a and 1b and/or it is necessary to explain the function of the apparatus 200.

The apparatus 200 comprises a tray 202 and a holder 204. The tray is configured to receive a mouldable element (not shown). As with the apparatus 100 of FIGS. 1a and 1b, the tray 202 is slideably received within the holder 204, such that sliding of the tray 202 further into the holder 204 results in inward deflection of the tray opposed sidewalls 208, 210. Also, and again as with the apparatus 100 of FIGS. 1a and 1b, the tray 202 and the holder 204 are articulated and comprise articulated sections 202a-c, 203a-c. The articulated sections of the holder 204 comprise inner articulated sections 204a-c and outer articulated sections 205a-c that correspond to those of the tray 202.

In the exemplary apparatus 200 of FIGS. 2a and 2b, the articulated sections are split into inner articulated sections 202a-c and outer articulated sections 203a-c. The inner and outer articulated sections are configured to maintain an equal spacing therebetween in the resting state. This is achieved by having fewer inner articulated sections 202a-c than outer articulated sections 203a-c to account for the tighter radius of the inner articulated sections. In the exemplary apparatus 200, one or more of the inner articulated sections that would correspond to the outer articulated sections 203a-c is removed and the remaining inner articulated sections are shaped to maintain the equal spacing and provide necessary support to the mouldable element. As can be seen from FIG. 2a, the remaining inner articulated sections, specifically 202b and 202c, are wider at a point nearer to the centre of the tray base 212 and tapered outwards from the centre of the tray base 212.

In exemplary apparatus disclosed herein, the holder 104 forms at least part of a compression mechanism that is configured to move the tray opposed sidewalls inwards. Such a compression mechanism is actuated by the user on application of the biting force. In other exemplary arrangements, the compression mechanism may take a different form. For example, the tray may comprise a button, trigger or other actuation device that may be operable by a user, for example, by hand. The actuation device may be located on a handle that it attached to the tray. The actuation device may be connected to a linkage that is configured to move the opposed tray sidewalls inwards on actuation of the actuation device. For example, labial sidewall and/or a buccal sidewall of the tray may be slideable relative to the other of the labial sidewall and buccal sidewall. The actuation device may be directly linked to one or both of the labial sidewall and a buccal sidewall such that operation of the actuation device moves the two sidewalls together. In other exemplary arrangements, the tray may be as described above and the compression mechanism may be formed as part of the holder and configured to move the holder opposed sidewalls inwards, thereby moving the tray opposed sidewalls inwards. Other exemplary arrangement are possible.

The skilled person will be able to envisage further embodiments without departing from the scope of the appended claims.

The invention claimed is:

1. An apparatus comprising:
a tray for receiving a mouldable element and for insertion into a user's mouth to allow the user to apply a biting force to the mouldable element to provide an impression of the user's teeth, the tray comprising:
opposed sidewalls extending from a base,
wherein at least one of the opposed sidewalls is moveable inwards for compressing the mouldable element against the user's teeth, the apparatus further comprising a compression mechanism configured to be actuated by the user and configured to move the at least one opposed sidewall inwards, wherein the compression mechanism comprises a holder for receiving the tray, and configured for moving the at least one opposed sidewall, and wherein the holder is configured to slideably receive the tray, such that the tray slides further into the holder when the user applies the biting force.

2. An apparatus according to claim 1, wherein the compression mechanism is operable on application of the biting force by the user.

3. An apparatus according to claim 1, wherein the holder is configured to deflect the at least one opposed sidewall inwards when the tray slides further into the holder.

4. An apparatus according to claim 1, wherein the opposed sidewalls are divergent from the base, and wherein the opposed sidewalls are in contact with a deflecting surface of the holder when the tray is received by the holder.

5. An apparatus according to claim 1, wherein the compression mechanism is configured to move the at least one of the opposed sidewalls by rotation.

6. An apparatus according to claim 1 further comprising a limiter configured to limit the movement of the at least one opposed sidewall.

7. An apparatus according to claim 1, wherein the tray is articulated for shaping the tray to fit an arch of the user's teeth.

8. An apparatus according to claim 7, wherein the tray comprises a plurality of discrete articulated sections.

9. An apparatus according to claim 8, wherein the articulated sections are equally spaced.

10. An apparatus according to claim 9, wherein each articulated section has a base which is tapered to maintain equal spacing.

11. An apparatus according to claim 7, wherein the holder is articulated for shaping the holder to the arch of the user's teeth.

12. An apparatus according to claim 11, wherein the holder comprises a plurality of articulated sections, each corresponding to an articulated section of the tray.

13. An apparatus according to claim 12, wherein each of the plurality of articulated sections of the holder is configured to deflect the corresponding articulated section of the tray.

14. An apparatus according to claim 12, wherein one or more of the articulated sections of the holder and the corresponding articulated section of the tray are configured to apply a different force when moving the at least one opposed sidewall.

15. An apparatus according to claim 1 wherein the mouldable element that the tray is configured to receive is one of a boil and bite mouthguard and a dental impression material.

16. An apparatus according to claim 1, further comprising the mouldable element.

17. An apparatus comprising:
a tray for receiving a mouldable element and for insertion into a user's mouth to allow the user to apply a biting force to the mouldable element to provide an impression of the user's teeth, the tray comprising:
opposed sidewalls extending from a base,
wherein at least one of the opposed sidewalls is moveable inwards for compressing the mouldable element against the user's teeth, wherein the tray comprises a plurality of discrete articulated sections, wherein the tray is articulated for shaping the tray to fit an arch of the user's teeth, wherein the articulated sections comprise discrete inner sections and discrete outer sections, and wherein there are fewer discrete inner sections than discrete outer sections to maintain equal spacing.

18. A kit of parts comprising:
a tray for receiving a mouldable element and for insertion into a user's mouth to allow the user to apply a biting force to the mouldable element to provide an impression of the user's teeth, the tray comprising opposed sidewalls extending from a base, wherein at least one of the opposed sidewalls is moveable inwards for compressing the mouldable element against the user's teeth; wherein the tray is articulated for shaping the tray to fit an arch of the user's teeth, wherein the articulated sections comprise discrete inner sections and discrete outer sections, and wherein there are fewer discrete inner sections than discrete outer sections to maintain equal spacing, and
a holder for receiving the tray, and configured to move the at least one opposed sidewall.

* * * * *